MEANS FOR SYNCHRONIZING A PAIR OF DATA HANDLING DEVICES

Filed July 24, 1953 6 Sheets-Sheet 1

INVENTORS
WILLIAM H. BURKHART
RICHARD J. LaMANNA
BY William S. Glover
AGENT

Nov. 11, 1958 W. H. BURKHART ET AL 2,860,323

MEANS FOR SYNCHRONIZING A PAIR OF DATA HANDLING DEVICES

Filed July 24, 1953 6 Sheets-Sheet 2

INVENTORS
WILLIAM H. BURKHART
RICHARD J. LAMANNA
BY William L. Glover
AGENT

INVENTORS
WILLIAM H. BURKHART
RICHARD J. LAMANNA
BY William [signature]
AGENT

INVENTORS
WILLIAM H. BURKHART
RICHARD J. LAMANNA
BY William L. Glover
AGENT

MEANS FOR SYNCHRONIZING A PAIR OF DATA HANDLING DEVICES

Filed July 24, 1953 6 Sheets-Sheet 5

INVENTORS
WILLIAM H. BURKHART
RICHARD J. LaMANNA
BY William D. Glover
AGENT

MEANS FOR SYNCHRONIZING A PAIR OF DATA HANDLING DEVICES

Filed July 24, 1953 6 Sheets-Sheet 6

INVENTORS
WILLIAM H. BURKHART
RICHARD J. LAMANNA
BY William L. Glover
AGENT

United States Patent Office 2,860,323

Patented Nov. 11, 1958

2,860,323

MEANS FOR SYNCHRONIZING A PAIR OF DATA HANDLING DEVICES

William H. Burkhart, East Orange, and Richard J. La Manna, Orange, N. J., assignors to Monroe Calculating Machine Company, Orange, N. J., a corporation of Delaware Application July 24, 1953, Serial No. 370,074

19 Claims. (Cl. 340—174)

This invention relates to electronic digital data handling means, and, more particularly to means for transferring data between a plurality of data handling devices or storage means which may be out of synchronism with one another, for example, magnetic drums or magnetic tapes or the like.

Magnetic drums of the sort with which the present invention is concerned comprise a rotating cylindrical member having a magnetizable peripheral surface which is divided, theoretically, into a plurality of contiguous circumferential channels or tracks each having a combined reading and recording head located immediately adjacent the surface thereof. Assuming the rate of rotation of the drum to be constant, each revolution thereof consumes a definite number of equal time periods during each of which a different cell, spot or area of each channel is positioned adjacent the associated read-record head for cooperation therewith, either to be magnetized thereby or to induce a signal therein, whichever operation is called for. Preferably, spots are magnetized with one polarity to represent binary one and with the opposite polarity to represent binary zero.

Two channels of the drum are set aside for synchronizing and timing purposes. One said channel contains a single magnetized spot which on each rotation of the drum, produces a signal that signifies the start of a cycle of operation. The other of said channels contains a full complement of magnetized spots which, on each cycle of operation, produce signals that signify the start of each time period during which a spot can be magnetized or can induce a signal in the associated head. Generally, the signals which signify the beginning of each time period of a cycle of operation are utilized to advance a counter one count for each time period. The state of the counter, therefore, indicates which time period has been reached in the current cycle of operation, and thus, which spot in each channel is adjacent the head for that channel. A matrix having an output line for each time period and group of time periods pertinent to the operation of the system, is connected to the several stages of the counter to reflect the state of the latter on said output lines, and the latter are applied to gating means whose purpose it is to prevent or permit reading or recording during a particular time period or group of time periods.

In some instances it is necessary that two or more synchronized drums or other storage devices be used in the same storage system. Generally speaking, two or more drums can be synchronized in any of several ways, that is, extremely costly servo mechanisms can be used, the drums can be driven by synchronous motors, or the drums can be coupled mechanically. The last two methods, of course, are much less expensive than the first, but it has been found that synchronous motors allow the drums to become misaligned by an amount equal to several time periods and that even the best mechanical couplings allow the drums to become misaligned by an amount equivalent to one or more time periods. This condition of misalignment, of course, prevents the transfer of data from one drum to the other during any given group of time periods as, at any instant, the drums are in positions appropriate to different time periods.

The same sort of conditions exist when it is attempted to synchronize a plurality of magnetic tapes, or one or more magnetic tapes with a magnetic drum, etc.

Heretofore it has been proposed to gate data into a shift register, under control of one drum or the like and then, when a predetermined amount of data is set up in the shift register, to shift control thereof to the other drum. This arrangement can be operated satisfactorily, but inasmuch as at least one flip-flop and a pair of pullers therefor, or the equivalent thereof, are required for each binary bit of data that is to be transferred between drums in each operation, the cost of said arrangement becomes prohibitive when the number of said bits is large, as is the usual case.

The principal object of the invention, therefore, is the provision of economical electronic means capable of transferring data between a plurality of data handling devices, or storage means which may be out of synchronism with one another, whose cost is not a function of the amount of data to be transferred.

According to one form of the invention, means are provided to transfer data in the form of binary ones and zeros, from one magnetic drum or other data storage device, to another which may be lagging there behind an amount equal, at maximum, to almost $n$ data time periods. A preferred form of said means include $n$ first flip-flops or the like, means for setting the same successively, each in accordance with every $n$th data bit, a second flip-flop or the like, and $n$ means for setting the same, each controlled by a first flip-flop and operable any time between successive settings of the latter depending on the amount which the lagging drum is behind the leading drum. The means for setting the first flip-flops are controlled by a reading circuit for the leading drum while the second flip-flop controls a recording circuit for the lagging drum.

In one setting of the described form of the invention, means are provided whereby data in the form of binary ones and zeros, is transferable from a computer to, or to the computer from, either a pair of magnetic drums or the like, of which one may be lagging the other an amount equal to almost $n$ data time periods. In this form of the invention the computer is synchronized with the leading drum and is arranged to accept data from either drum only during predetermined time periods of each cycle and to transmit data to the drums only during those time periods which are P time periods earlier. A pair of the means of the invention described above in connection with transferring data between drums is provided, a first, to delay data transmitted from the computer to the lagging drum sufficiently to synchronize it with the latter, and a second, to delay data transmitted from said drum to the computer variable amounts as required for synchronism. The total delay which both said means impart to a data bit transmitted from the computer to the drum and then back to the computer, when added to any other inherent delays encountered in transmitting the bit to and from the drum, determines the magnitude of P above. In order to delay data transmitted from the leading drum to the computer so as to apply the same to the latter at the appropriate time, a delay network having an effective delay of P time periods is interposed in the connection between the two.

A modification of the means of the inventions is also contemplated, which, for a maximum misalignment between storage devices of up to $n$ data time periods, includes $n$ condensers, means for charging the same differentially in succession, each in accordance with every $n$th data bit emitted from the leading storage device, and means for sensing the state of each condenser any time between successive operations of the charging means therefor, depending on the amount of misalignment between the storage devices at the time.

Other objects and features of the invention will become apparent from the following description when read in the light of the attached drawing of which:

Figure 1:
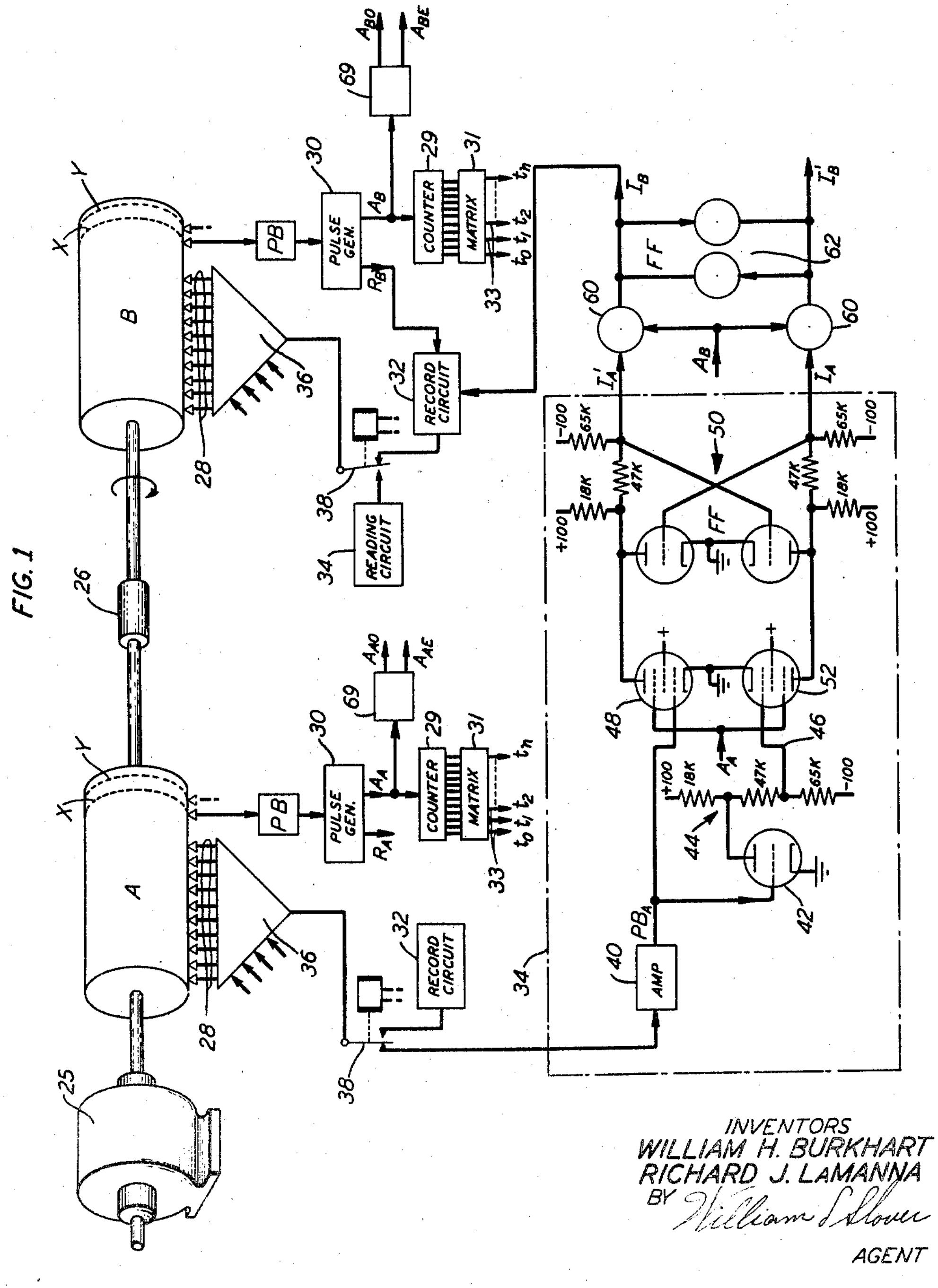
Fig. 1 is a schematic wiring diagram of an exemplary embodiment of the means of the invention.
Figure 2:
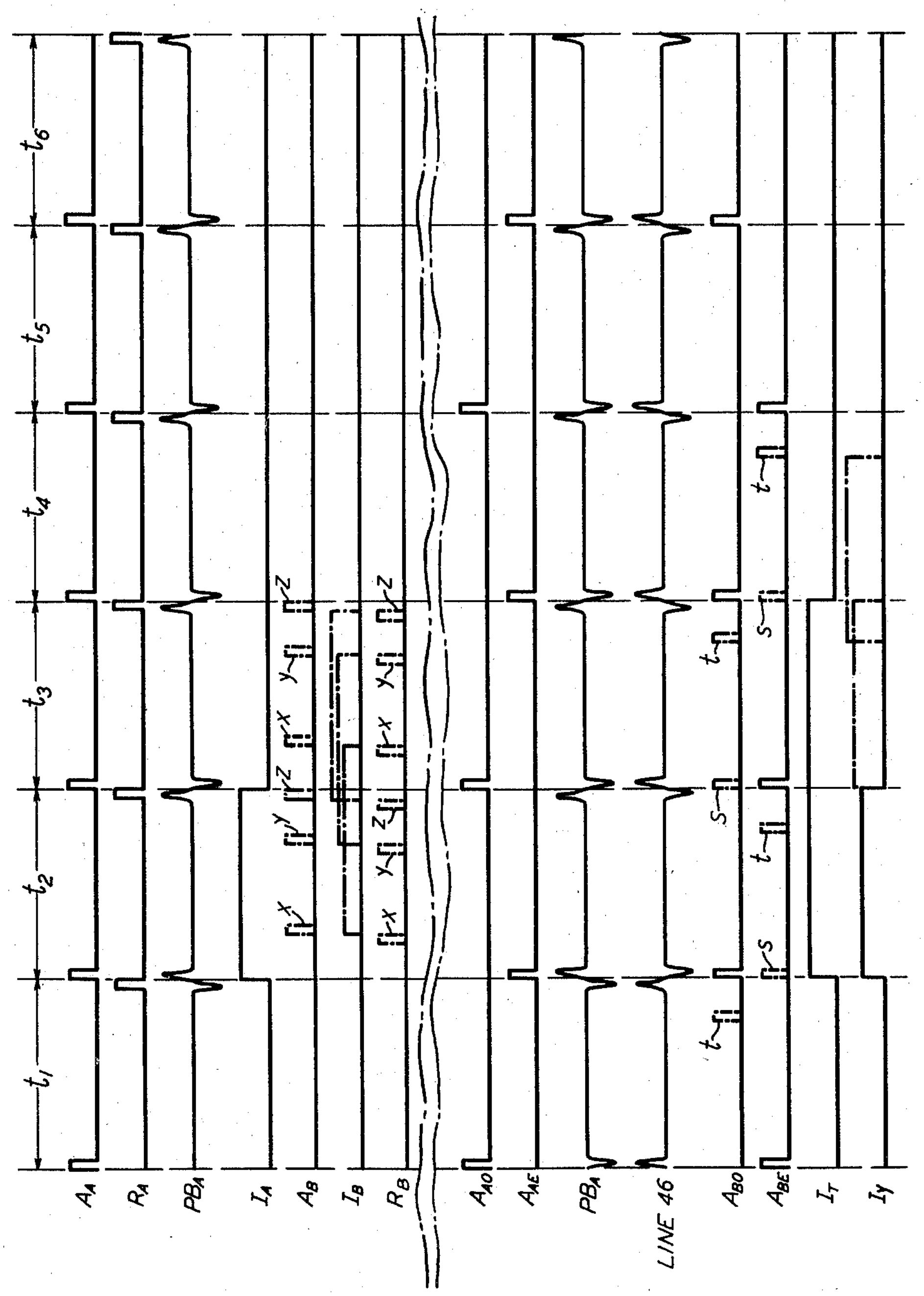
Fig. 2 is a pulse chart which illustrates the mode of operation of the means of the invention.

Referring to Figs. 1 and 2, there is illustrated a master drum A rotated by a suitable motor 25 and having a second drum B connected therewith by a mechanical coupling 26. It is to be understood, of course, that the drums may be driven separately, by synchronous motors, if desired. Each drum has a magnetizable peripheral surface which is divided, theoretically, into a plurality of contiguous circumferential channels or tracks each having a combined reading and recording head 28 located immediately adjacent the surface thereof. A rotation of each drum is divided into a definite number of time periods during each of which a different cell or spot of each channel is positioned adjacent the associated read-record head 28 for cooperation therewith, either to be magnetized thereby or to induce a signal therein, whichever operation is called for. Spots are magnetized with one polarity to represent binary one and with the opposite polarity to represent binary zero. One channel $x$ of each drum is provided with a full complement of magnetized spots which serve to actuate a pulse generator 30. Said pulse generator produces a train of pulses A, of which each initiates a said time period, and also a train of pulses R, which are used to time the magnetizing of spots within the said time periods. Subscripts A and B are applied to the pulse designations A and R to indicate which drum effects production thereof. A second channel $y$ of each drum may also be used for synchronizing purposes but as the latter is not necessary to an understanding of the invention, the same will not be described further.

In order to identify the time periods initiated by the $A_A$ pulses, chiefly for gating purposes, the same are applied to a counter 29 which is advanced step by step thereby. The several stages of the counter are connected to a matrix 31 having output lines 33 appropriate to all of the time periods and groups of time periods which it is desired to identify.

The arrangement is such, that as each time period is initiated by a said $A_A$ pulse, the counter is advanced one step to a count which identifies said time period. Further, the counter remains at said count until the next $A_A$ pulse occurs, that is, for the entire time period, and maintains the appropriate output line or lines 33 of matrix 31 at a high potential during that time.

A similar counter and matrix arrangement 29, 31, 33 may also be provided to identify the time periods initiated by the $A_B$ pulses produced by generator 30 for drum B. Preferably, each counter is restored or otherwise set to an initial count preparatory to each cycle or rotation of the associated drum, under control of a signal magnetized spot in the synchronizing channel $y$ mentioned above. For a more complete description of a said counter-matrix arrangement and of the mode of operation thereof, reference is made to the copending application to W. Burkhart Ser. No. 298,526, filed July 12, 1952.

The read-record heads 28 for each drum A and B are selectively connectable with a single Record circuit 32 or Reading (playback) circuit 34 through the medium of a selection circuit 36 and a relay operated transfer contact 38. Selection circuit 36 may be of any suitable sort adapted to connect any selected one of the heads 28 with the transfer contact 38, under appropriate control. In like manner the transfer contact 38 may be controlled in any suitable way to effect reading or recording as desired. More complete descriptions of the selection circuits 36, the transfer contacts 38, the Record circuits 32 and the modes of operation thereof, while not requisite to an understanding of the present invention, are to be found in the copending applications to W. Burkhart et al. Ser. Nos. 255,712, filed November 9, 1951, and 298,526.

Each Reading, or Playback, circuit 34 comprises an amplifying section 40 wherein the minute signals induced in a read-record head 28 are amplified, and a coincidence detection and pulse shaping section. The output of the amplifying section 40 of the Read circuit 34 for drum A is labeled $PB_A$ and is illustrated diagrammatically in the chart of Fig. 2 wherein it will be seen that each signal comprises positively and negatively directed lobes whose order of occurrence differentiates the signals as representative of binary one or binary zero. For example, a signal which comprises a negatively directed lobe followed by a positively directed lobe represents binary one, and a signal composed of a positive lobe followed by a negative lobe represents binary zero. It will be noted in Fig. 2 that the lagging lobe of each signal $PB_A$ occurs coincidentally with the A pulse ($A_A$ in Fig. 2) which initiates the time period following that in which the magnetized spot which effected production of the signal was recorded during a prior rotation of the drum. For example, a spot magnetized at R pulse time of the time period $t_1$ of a given drum rotation, is effective, on a subsequent drum rotation, to cause production of a signal $PB_A$ whose lagging lobe occurs coincidentally with the A pulse which initiates time period $t_2$.

The signals $PB_A$ are applied to an inverter 42 which comprises a triode that is cut off by the negatively directed lobe of each signal and which conducts in response to each positively directed lobe. The anode of the triode is applied to a three-section voltage divider 44 having an output line 46 extended from a center tap thereof. Preferably, the magnitudes of the signals $PB_A$, the characteristics of the triode, and the resistor values of the voltage divider 44 are such that output line 46 of the latter assumes potentials of zero and $-20$ volts as the triode is cut off and conducts respectively. These potentials of zero and $-20$ volts are utilized throughout the means of the invention and will hereinafter be referred to as high and low potentials, respectively.

The signals $PB_A$ may also be applied to a pentode puller 48 adapted to pull a flip-flop 50 to a state indicative of binary one. A second pentode puller 52, to which the output line 46 of inverter 42 is applied, serves to pull the flip-flop to the opposite state in which it indicates binary zero. The pentode pullers 48 and 52 are also controlled by the $A_A$ pulses which time the operations thereof. Preferably the said pentodes are of the type whose suppressor grids serve as second control grids, and which conduct only when suitably high potentials (in the present instance, approximately zero volts) are applied to both said grids coincidentally. Accordingly, the $A_A$ pulses, the signals $PB_A$ and the output line 46 of the inverter 42 are applied, each to a control or suppressor grid of the appropriate pentode 48 or 52. The flip-flop 50 comprises a pair of inverters each having its output line applied to the grid of the other, and its anode directly coupled to the anode of the associated puller 48 or 52. Evidently, conduction of a puller has the same effect as conduction of the associated flip-flop tube, that is, it cuts off the other flip-flop tube and the latter applies a high potential to the former (flip-flop tube) to maintain the same conductive.

It will be seen therefore that the pullers 48 and 52 which are both conditioned for operation (conduction) by each $A_A$ pulse, are operated selectively under control of each $PB_A$ signal. When the lagging lobe of a $PB_A$ signal is positively directed, the same effects conduction of the puller 48, and the flip-flop 50 is set to indicate a binary one. However, when the lagging lobe of a $PB_A$ signal is negatively directed, it maintains the puller 48 cut off and also cuts off the inverter 42 which applies a high potential to the puller 52 to effect conduction of the latter. This, of course, sets flip-flop 50 to indicate binary zero.

The output of flip-flop 50 which assumes a high potential when the same is set to indicate binary one is labeled $I_A$, and the output thereof which assumes a high potential when the same is set to indicate binary zero is labeled $I_A'$. Referring to the chart of Fig. 2, it will be seen that the flip-flop 50, when set to indicate binary one, or for that matter, binary zero, during the span of one $A_A$ pulse, remains set in that state until the occurrence of a $PB_A$ signal of opposite significance at a subsequent $A_A$ pulse time.

It will be noted also that a spot magnetized at R pulse time of a given time period of one drum rotation or cycle, does not affect the state of the flip-flop 50 until the time period of a subsequent drum rotation which follows said given time period. For example, a spot recorded at R pulse time of time period $t_1$ of cycle one, may be read back to affect the state of flip-flop 50 during time period $t_2$ of cycle 2 et seq. In short, a one time period delay is counted in the reading or playing back of a magnetized spot. It is to be mentioned that it is possible, theoretically, to eliminate this one time period delay if the same pulse used for recording is also used to time the reading or playback means, and the record and playback means are so constructed that no delays are occasioned thereby.

In order to synchronize the drums A and B to the extent that data recorded on the former during selected time periods of one cycle may be read back on a later cycle and recorded on drum B during those same time periods, it is necessary for drum B to lag behind drum A an angular distance equivalent to the amount of delay encountered in reading back data from the latter drum, in the present instance one time period. Thus, for example, the $A_A$ pulse which initiates time period $t_2$ of drum A and effects setting of the flip-flop 50 in accordance with a spot recorded on said drum during time period $t_1$ of a preceding cycle, occurs prior to the $R_B$ pulse for time period $t_1$ of drum B which may, therefore, effect recording of a spot on said drum in accordance with said setting of the flip-flop 50.

It will be understood, of course, that in systems where no delay is encountered in reading back or in recording, and in systems wherein it is not necessary to rerecord data during the same time period in which it was originally recorded, the secondary or slave drum need not lag behind the master drum.

In either event, that is, whether an intentional lag is provided or not, an unwanted, variable misalignment of the drums may be introduced by imperfections in the coupling 26 or by other causes. The effect of this unwanted variable misalignment is to prevent accurately timed, direct transfers of data from drum A to drum B. Therefore, means presently to be described are provided to compensate for said unwanted, variable misalignment.

It has been found that the misalignments introduced by coupling imperfections are oscillatory in nature so that at one time the drum B leads the drum A while at another time it lags the later. In order to eliminate the necessity for compensating for both lead and lag, the maximum amount which drum B ever leads drum A is determined, for example, by measuring the time intervals between the synchronizing signals from both drums and the aligned position of the drums (including any intentional lag) is considered to be that in which drum B leads by said maximum amount. Then the positions of the reading heads for the synchronizing channels $x$ and $y$ of the drums are adjusted in known manner, to align the synchronizing signals appropriately while the drums are in the said aligned position. Therefore, all of the misalignments between the drums appear as lags of drum B, and the compensating means need only be capable of compensating for said lags. If desired, the same end may be achieved by providing an intentional lag equal to or greater than the greatest amount which drum A ever leads drum B. To facilitate the description of the means for compensating for said variable lag, an extremely simplified means which is adapted to compensate for an amount of lag less than that equivalent to one full time period, will be described first and then the more complex means of the invention which are capable of compensating for greater amounts of lag, will be described.

Referring to Fig. 1 the outputs $I_A$ and $I_A'$ of the flip-flop 50 are applied to pentode pullers 60 for a flip-flop 62. The pentode pullers 60 are also controlled by the pulses $A_B$ from the pulse generator associated with drum B. The outputs of flip-flop 62 are labeled $I_B$ and $I_B'$, the former assuming a high potential to indicate binary one and the latter assuming a high potential to indicate binary zero. The output $I_B$ is applied to the record circuit 32 for drum B.

Referring to the chart of Fig. 2, it will be seen that the setting which flop-flop 50 assumes on the occurrence of the $A_A$ pulse which initiates a given time period of drum A, for example, time period $t_2$, is transferred to the flip-flop 62 as soon as the $A_B$ pulse which initiates time period $t_1$ of drum B, occurs. As indicated at $x$, $y$, and $z$ in Fig. 2 the said $A_B$ pulse may occur any time prior to the occurrence of the next following $A_A$ pulse which may effect resetting of the flip-flop 50. The flip-flop 62 remains as set until the $R_B$ pulse which occurs near the end of the time period initiated by said $A_B$ pulse, effects an operation of the record circuit 32 for drum B in accordance with said setting, after which the flip-flop may be reset on the occurrence of the next $A_B$ pulse. For convenience, the $R_B$ pulses are given the same designations $x$, $y$ and $z$ as the $A_B$ pulses which initiate the time periods in which they occur.

It is to be mentioned that the $A_B$ pulses which control the pullers 60 for flip-flop 62 should be of sufficient duration so that, when an $A_A$ pulse and an $A_B$ pulse occur coincidentally, the setting of the flip-flop 50 effected by the former is transferred to the flip-flop 62 under control of the latter.

Figure 3:
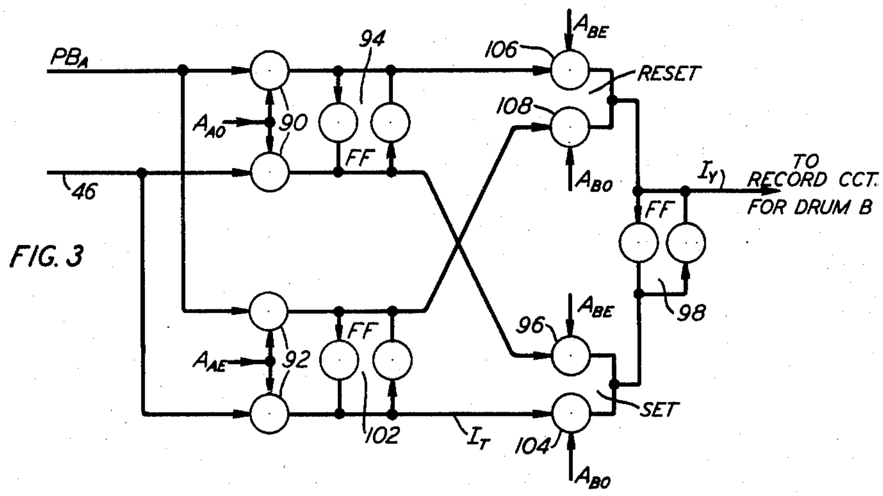
Fig. 3 is a schematic wiring diagram of one form of the invention as applied to the arrangement of Fig. 1.

Referring to Figs. 2 and 3, the means of the invention which are capable of compensating for drum misalignments equivalent to one or more time periods will now be described. For convenience, the said means will be described as capable of compensating for variable lags of drum B which are less than that equivalent to two full time periods, and then, the manner of extending the capacity thereof will be pointed out.

The compensating means are controlled by four pulse trains $A_{AO}$, $A_{AE}$, $A_{BO}$ and $A_{BE}$ which are produced by dividing each pulse train $A_A$ and $A_B$ into a pair of pulse trains of which one includes all of the $A_A$ or $A_B$ pulses appropriate to even numbered time periods and the other includes all those appropriate to the odd numbered time periods. The differentiating designations O and E, of course, stand for odd and even. The means for dividing the pulse trains $A_A$ and $A_B$ may comprise duplicate circuits 69 (Fig. 1) of any suitable sort. For example, a center fed flip-flop set and reset by the $A_A$ pulses may condition a pair of pulse producers for alternative operation by said $A_A$ pulse, to produce $A_{AO}$ and $A_{AE}$ pulses. The pulse producers may comprise a first pair of inverters arranged to sense the states of the flip-flop in the manner taught in Patent No. 2,601,089 to W. Burkhart, and a second pair of inverters to invert the outputs of the first pair. Further, where the misalignment between the drums is equal to two or more time periods the means for producing the odd and even numbered $A_A$ and $A_B$ pulses may be utilized to drive other means adapted to further divide the $A_A$ and $A_B$ pulse trains. For example, the $A_{AO}$ and $A_{AE}$, or the $A_{BO}$ and $A_{BE}$ pulses may drive a magnetic delay line or shift register of the sort disclosed by An Wang in an article entitled, "Magnetic Delay Lines Storage" in the Proceedings of the I. R. E. for April 1951, vol. 39, pp. 401–407. As disclosed in said article, a said delay line or shift register includes a series of saturable magnetic cores which are driven to saturation in opposite directions to represent binary one and binary zero. Advance pulses are applied to suitable windings on the cores to transfer the successive settings of an initial one of the cores to the other cores of the shift register in succession. By connecting the last core of the shift register back to said initial one to form a ring, it is possible to shift a binary one setting of the latter round and round the ring indefinitely. In transferring the said binary one setting from each core to the next, a transient pulse is produced in the output winding of the former which is substantially coincident with the advance pulse which effected the said transfer. These transient pulses may conveniently be used in the place of the advance pulses where it is desired to use only every $n$th one of the latter. The number of cores in the ring, of course, determine the repetition frequency of said transient pulses. For example, a fifteen-core ring is required to produce fifteen interlaced divisional pulse trains from an $A_A$ or $A_B$ pulse train. If required, known means may be provided to sharpen, or clip or otherwise shape and/or retime the transient pulses from the cores before using the same as A pulses.

Other means for dividing the $A_A$ or $A_B$ pulse trains may comprise a counter, driven by the $A_A$ or $A_B$ pulses and having a capacity which is at least equal to the number of a division of the pulse train ($A_A$ or $A_B$) that are required, a diode matrix to which each stage of the counter is connected and which has an output line for each count of the counter and coincidence gate means to which the matrix outputs are applied along with the $A_A$ or $A_B$ pulses that drive the counter. If required, inverters may be provided to invert the outputs of the the coincidence gate means.

Referring now to Figs. 1 and 3, the output $PB_A$ of the playback amplifier 40 for drum A, and the inverse of said output, that produced on line 46, are applied in parallel to a pair of pentode pullers 90 and to a pair of pentode pullers 92. Preferably, the output $PB_A$ and the line 46 are applied to the suppressor grids of the pentode pullers 90 and 92 while the odd numbered $A_A$ pulses, that is, the $A_{AO}$ pulses are applied to the control grids of the pullers 90 and the $A_{AE}$ pulses (even numbered $A_A$ pulses) are applied to the control grids of the pullers 92. The pullers 90 serve to set and reset a flip-flop 94 to states indicative of binary one and binary zero, and the pullers 92 exert a similar control over a flip-flop 102. Those outputs of the flip-flops 94 and 102 which assume high potentials when the flip-flops are set to their binary one states are applied to pentode pullers 96 and 104 which are also controlled by the $A_{BE}$ and $A_{BO}$ pulses, respectively. Said pullers 96 and 104 are connected, anode to anode, with one tube of a flip-flop 98 to set the same to a state indicative of binary one on operation of either thereof. The output of flip-flop 98 which assumes a high potential when the latter is set to its binary one state is connected to the record circuit 32 for drum B (Fig. 1). Flip-flop 98 is reset to its binary zero state whenever the flip-flop 94 or 102 which is controlling on the occurrence of an $A_{BE}$ or $A_{BO}$ pulse, is in its binary zero state. The means for accomplishing this may be of any suitable sort. For example, those outputs of the flip-flops 94 and 102 which assume high potentials when the flip-flops are set in their binary zero states may be applied to pentode pullers 106 and 108, respectively, along with the $A_{BE}$ and $A_{BO}$ pulses, to effect resetting of the flip-flop 98 at appropriate times.

The circuit arrangement is such that data played back from drum A can be entered into the flip-flop 94 by the pullers 90 only during odd numbered time periods of drum A and into the flip-flop 102 by the pullers 92 only during even numbered time periods of drum A. Referring more particularly to Fig. 2, it will be seen that when reading back a binary one originally recorded on drum A during time period $t_1$, of a preceding cycle, a signal $PB_A$ is produced whose positively directed lobe occurs coincidentally with the $A_{AE}$ pulse for time period $t_2$ of drum A. This, of course, effects operations of the puller 92 to which the said signal $PB_A$ is applied (Fig. 3) and the flip-flop 102 is set to indicate binary one. Therefore, the output of flip-flop 102 which assumes a high potential when the same is set to indicate binary one and which is labeled $I_T$ for convenience in reading the chart of Fig. 2, conditions the puller 104 with which it is connected for operation by the next following $A_{BO}$ pulse, that is, the one which initiates time period $t_1$ of drum B. For the present, it will be assumed that the drums A and B are more or less properly aligned and that the said $A_{BO}$ pulse occurs simultaneously with the $A_{AE}$ pulse, it being remembered that drum B intentionally lags drum A one full time period. This being so, the puller 104 to which the line $I_T$ is applied, operates as soon as said line is raised to a high potential of approximately zero volts on setting of the flip-flop 102, and the flip-flop 98 is immediately set to indicate binary one. Therefore, the output of said flip-flop 98 which is applied to the record circuit for drum B (in place of output $I_B$ of flip-flop 62 shown in Fig. 1) and which is labeled $I_Y$ for convenience in reading the chart of Fig. 2 assumes a high potential to effect recording of a binary one on drum B during time period $t_1$ thereof. It is to be noted that the signal $PB_A$ which is applied to the pullers 92 is transmitted through the flip-flops 102 and 98 and is applied to the drum B record circuit 34 substantially without delay, due to the coincidental occurrence of the $A_{AE}$ and the $A_{BO}$ pulses.

It is to be mentioned that the $A_{BO}$ (and also the $A_{BE}$) pulses should be of sufficient duration so that when one of the same occurs coincidentally with an $A_{AE}$ (or an $A_{AO}$) pulse, the setting of the flip-flop 102 (or 94) effected by the latter may be transferred to the flip-flop 92 under control of the former.

Still referring to Fig. 2, it will be noted that the flip-flop 98 which serves to apply a high potential to the record circuit 32 for drum B during time period $t_2$ of drum A (time period $t_1$ of drum B), is reset to apply a low potential to said record circuit on the occurrence of the next following $A_{BE}$ pulse due to the fact that the flip-flop 94 which is controlling at that time, is in its binary zero state. However, if said flip-flop 94 should be in its binary one state on the occurrence of the $A_{BE}$ pulse, the flip-flop 98 would not be reset.

It will now be assumed that a misalignment of, say, one time period, exists between drum A and drum B, that is, drum B lags behind drum A an amount equal to one time period. This condition is shown in dotted lines in Fig. 2 and is designated by the letter S.

Again, the flip-flop 102 is set to indicate binary one during the time of the span of the $A_{AE}$ pulse which initiates time period $t_2$ of drum A. Substantially one full time period later, an $A_{BO}$ pulse occurs and enables the puller 104 to which line $I_T$ is applied, to be operated by the latter. This, of course, effects setting of flip-flop 98 to the binary one state, and the latter effects an operation of the record circuit 32 for drum B (Fig. 1) on the occurrence of the next following $R_B$ pulse. It will be noticed that the data applied to the pullers 92 in time with drum A is not reflected at the output $I_Y$ of flip-flop 98 until it has been delayed sufficiently to be brought into timed alignment with drum B, that is, one full time period.

Another condition of alignment of the drums, one in which they are misaligned by an amount equivalent to almost two time periods, is indicated in dotted lines in Fig. 2 under the label, *t*. Under this condition, almost two time periods elapse between the setting of flip-flop 102 under control of the $A_{AE}$ pulse which initiates time period $t_1$ of drum A and the transfer of said setting to the flip-flop 98 under control of the $A_{BO}$ pulse which initiates time period $t_1$ of drum B. Thus, the said, "almost two time periods" misalignment of the drums is compensated for.

It will be seen, therefore, that data gated into the flip-flops 94 and 102 under control of the $A_{AO}$ and $A_{AE}$ pulses, is not transferred to the flip-flop 98 until the corresponding $A_{BE}$ and $A_{BO}$ pulses occur, that is, the data is delayed an amount equal, in time, to the lag of drum B. Where the maximum amount of said lag equals, or is greater than, two time periods, additional flip-flops 94 and 102 and additional pullers 96 and 104 for flip flop 98 are required, and, it is necessary to further divide the pulse trains $A_A$ and $A_B$ so as to provide a division of the former for each flip-flop 94, 102, etc., and a division of the latter for each puller 96, 104, etc. For example, where the maximum amount of lag is equal to fourteen time periods or more, but less than fifteen time periods, fifteen of said flip-flops and said pullers are provided, and, the $A_A$ and $A_B$ pulse trains are each divided into fifteen interlaced pulse trains which are like the "odd" and "even" pulse trains $A_{AO}$, $A_{BO}$ and $A_{AE}$ and $A_{BE}$ described above, except that each only includes every fifteenth $A_A$ or $A_B$ pulse. Each of the fifteen flip-flops is controlled by one of the fifteen $A_A$ pulse train divisions and the puller (of the fifteen) controlled thereby is also controlled by the corresponding one of the $A_B$ pulse train divisions, that is, the one whose pulses occur coincidentally with those of the former ($A_B$ pulse train division) when the drums are aligned properly.

At this point, it is to be mentioned that in systems wherein the same pulses, for example, the R pulses, are used for timing both recording and reading back, the flip-flops 62 and 98 of the circuits of Figs. 1 and 3, and the pullers therefor, may be eliminated and the inputs thereto may be applied to coincidence gate means in the record circuit for drum B. For example, the record circuit may, as usual, include a pair of coincidence gates of which one is operated to effect recording of a binary one while the other is used to effect recording of binary zero. Both gates may have the $R_B$ pulses applied thereto in the usual fashion and the binary one gate may have the outputs of the flip-flops 94 and 102 (Fig. 3) which assume a high potential to indicate binary one applied thereto through a suitable "Or" gate or the like. The binary zero coincidence gate may be controlled either by the inversion of the input to the binary one gate or by the outputs of the flip-flops 94 and 102 which assume high potentials to indicate binary zero, said outputs of course being suitably gated to provide a high potential only when both of the same are high.

Figure 4:
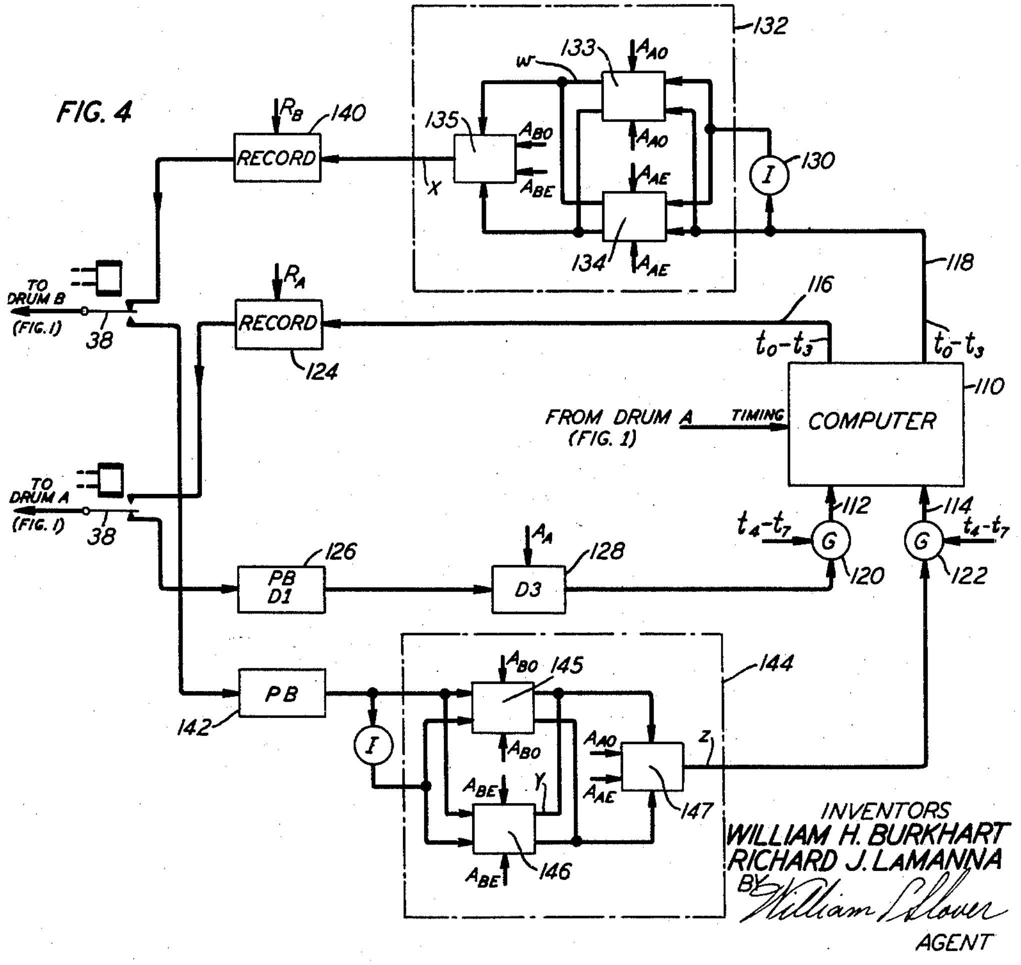
Fig. 4 is a block, wiring diagram of a modified embodiment of the means of the invention as illustrated in Fig. 3.

In many systems it is not desired to transfer data directly from one drum to another as much as it is to transfer data back and forth between each of a plurality of drums and a computer which is synchronized with only one of the drums namely, the master drum. Means for accomplishing this are illustrated in Fig. 4 wherein the master drum A and the secondary drum B of Fig. 1 are associated with an electronic computer 110. For conveninence, it will be assumed that an intentional misalignment of the drums equal to the duration of an A pulse, or more, is provided for a reason to be explained hereinafter and that the maximum unintentional misalignment which may exist between the drums equals a little less than two time periods. Further, in order to simplify the illustration of Fig. 4 the same is terminated at the transfer contacts 38 and reference is made to Fig. 1 for the circuitry there beyond.

The computer 110 is provided with a pair of input lines 112 and 114 over which data from the two drums may be transmitted thereto, and with a pair of output lines 116 and 118 over which data may be transmitted from the computer to the two drums. A third input to the computer, that labeled "Timing," stems from drum A and serves to synchronize the computer with said drum.

Coincidence gates 120 and 122 inserted in the computer input lines 112 and 114 serve to prevent the entry of data signals into the computer except during predetermined time periods on which the appropriate timing signals are also applied to the gates. For reasons to become apparent hereinafter, the gates 120 and 122 are opened during time periods $t_4$–$t_7$ of drum A in the illustrated instance of the invention. Also, the internal timing and delay systems of the computer are arranged in known manner to produce output signals on the output lines 116 and 118 only during predetermined time periods, in the present instance, time periods $t_0$–$t_3$. An example of timing, and delay arrangements of this sort is to be found in the copending application to W. Burkhart, Ser. No. 298,526.

The coincidence gates 120 and 122 may be of any suitable sort, for example, each may comprise a pentode like those indicated at 48 and 52 in Fig. 1 but having its anode connected to a voltage divider in the same manner as inverter 42.

The output line 116 for computer 110 is applied to a record circuit 124 for drum A which is also provided with a reading or playback circuit 126 that may be identical with the reading circuit 34 of Fig. 1, and which, like the latter, occasions a one time period delay of data read back from the drum. The output of reading circuit 126 is applied to a three time period, $A_A$ pulse controlled, delay circuit 128 which may comprise a shift register of the sort disclosed in the patent to W. Burkhart, 2,601,089. The output of the delay circuit is applied to the gate 120 for computer input line 112.

The output line 118 for computer 110 is applied to an inverter 130, and, along with the output of the latter, to a compensating circuit 132 which may be identical with the one illustrated in Fig. 3, except that the roles of the $A_{BO}$ and the $A_{BE}$ pulse trains in controlling said circuit are reversed due to the fact that the drums with which the latter is associated are not intentionally misaligned one full time period as are the drums with which the circuit of Fig. 3 is associated as described hereinabove. The three flip-flops of circuit 132 which correspond with the flip-flops 94, 102 and 98 of the circuit of Fig. 3 are shown in simplified block form and are labeled 133, 134 and 135 respectively. Additionally, the output lines of the flip-flops 133 and 135 which assume high potentials when the latter are set to states indicative of binary one, are labeled W and X respectively.

The output of the compensating circuit 132 is applied to the record circuit 140 for drum B to effect operations thereof at appropriate times even though said drum is misaligned with drum A and thus is out of synchronism with the computer 110 whose operations are timed by the latter drum.

The Reading or Playback amplifier circuit 142 for drum B is connected with the input line 114 for computer 110 by a compensating circuit 144 which may be identical with compensating circuit 132 except for the manner in which the same is controlled by the $A_{BO}$, $A_{BE}$, $A_{AO}$ and $A_{AE}$ pulses. The three flip-flops of circuit 144 which correspond with the flip-flops 133, 134 and 135 of circuit 132 are labeled 145, 146 and 147 respectively, and the outputs of the flip-flops 146 and 147 which assume high potentials when the latter are set to indicate binary one are designated Y and Z.

As shown in Fig. 4, the flip-flops 145 and 146 are under control of the $A_{BO}$ and $A_{BE}$ pulses respectively, while flip-flop 147 is under control of the $A_{AE}$ and $A_{AO}$ pulses.

In order to facilitate an understanding of the mode of operation of the arrangement of Fig. 4, the same will be described in connection with a specific problem. It will be assumed that a binary one signal read back from drum A during time period $t_0$ of that drum, is to be applied to computer 110 during time period $t_4$ of the same cycle and then, on a later cycle, is to be transmitted to drum B whereon it is to be recorded during time period $t_1$ thereof. It will also be assumed, that on a still later cycle the said signal is to be read back from drum B and applied to computer 110 during time period $t_4$, whence it later is transmitted back to drum A for recording thereon during time period $t_0$.

Figure 5:
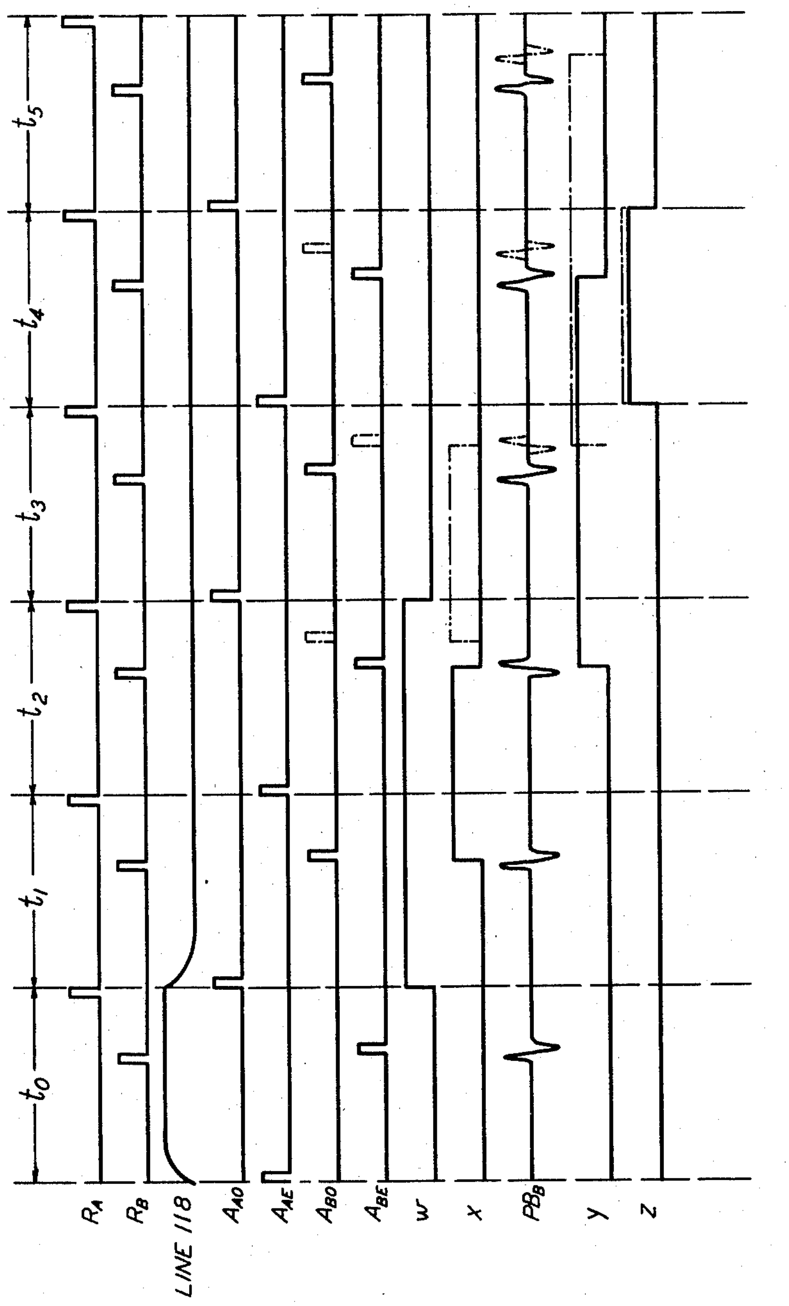
Fig. 5 is a pulse chart which illustrates the mode of operation of the means of the invention in the setting of Fig. 4.

Prior to entering into the said description, however, it is to be mentioned that, preferably, the signals applied to the output lines 116 and 118 of computer 110 are integrated or delayed as indicated in Fig. 5 so that coincidence between the same and the $R_B$ pulse for the time period in which the former occurs and between the same and the $A_{AO}$ or $A_{AE}$ pulse for the next time period are assured, while coincidence between the same and the $A_{AO}$ or $A_{AE}$ pulse prior to that last mentioned is prevented. This arrangement provides for more dependable and error-free operation.

Referring to Figs. 4 and 5, a binary one signal read back from drum A during time period $t_0$ of that drum is delayed one time period in the playback circuit 126, as described hereinabove, then is applied to the delay circuit 128 which delays it an additional three time periods. The signal is then applied to the coincidence gate 120 during time period $t_4$ and thence is entered into the computer. During time period $t_0$ of some later cycle of drum A, the binary one signal may be transmitted from the computer over line 118, assuming, of course, that the value thereof was not changed by some calculation performed in the computer. The signal transmitted over line 118, as shown on the appropriate line of the chart of Fig. 5, is effective to set flip-flop 133 of the compensating circuit 132 to its binary one condition on the occurrence of the $A_{AO}$ pulse during time period $t_1$. This, of course, raises the potential of output line W of said flip-flop and the flip-flop 135 is set to its binary one condition on the occurrence of the next following $A_{BO}$ pulse (the one which initiates time period $t_1$ of drum B). As indicated in Fig. 5 the misalignment between drums A and B is taken, for example, as approximately ⅔ of a time period. Therefore, a delay of approximately ⅔ of a time period is occasioned between the setting of flip-flop 133 and the setting of flip-flop 135. When the flip-flop 135 is set to its binary one state, however, the output line X thereof assumes a high potential and is effective to cause an operation of the record circuit 140 on the occurrence of the $R_B$ pulse for time period $t_1$ of drum B. Following recording during time period $t_1$ of drum B, the flip-flop 135 is reset under control of the $A_{BE}$ pulse which initiates time period $t_2$ of drum B.

On a later cycle, when the relay pyramid 36, etc., of Fig. 1 is set appropriately, the binary one signal recorded on drum A is read back by the playback amplifier 142 at the end of time period $t_1$ of drum B and effects setting of the flip-flop 146 to its binary one state on the occurrence of the $A_{BE}$ pulse which initiates time period $t_2$ of drum B. This action, of course, raises the potential of output line Y of flip-flop 146, and when the next following $A_{AE}$ pulse occurs, that which initiates time period $t_4$ of drum A, the flip-flop 138 is set to its binary one state and the output line Z thereof assumes a high potential. This high potential of line Z is maintained for the duration of time period $t_4$ of drum A until the flip-flop 147 is reset under control of the $A_{AO}$ pulse which initiates time period $t_5$. Therefore, all during time period $t_4$ a high potential is applied to the coincidence gate 122 and the latter effects the appropriate control of the computer input line 114.

Again assuming that the binary one signal entered into the computer 110 is not changed but merely is delayed therein for a period of time, the same may be transmitted over line 116 during time period $t_0$ of a later cycle. Therefore, it effects appropriate operation of the Record circuit 124 during time period $t_0$ of drum A, and the signal is again recorded on that drum during said time period.

It is to be noted that where, as in the illustrated instance of the invention, the misalignments between the drums are oscillatory in nature and thus are substantially identical at the same point in each of a plurality of cycles, the amount which a binary digit signal is delayed by compensating circuit 144 is the complement of the amount which it was delayed by the compensating circuit 132, with respect to the number of full time periods which elapse between the pulses of each of the trains controlling said compensating circuits. Where $n$ time periods elapse between successive pulses of each train and the delay afforded by compensating circuit 132 is X time periods, the delay afforded by compensating circuit 144 is $(n-X)$ time periods. For example, in the instance of the invention illustrated in Figs. 4 and 5, $n=2$ time periods, $X=⅔$ time period and $(n-X)=1⅓$ time periods. This relation does not exist however where the amount of misalignment between the drums at a given point of cycle, varies from cycle to cycle. Under this condition the delays afforded by the two compensating circuits are independent of one another.

The delays encountered in transmitting a binary digit signal from computer 110 through the compensating circuit 132 to drum B and from drum B through compensating circuit 144 to computer input gate 122 (ignoring full cycle delays between recording on and reading from drum B), determine the difference in timing between the computer's input and output circuits and also, the amount of delay to be afforded by circuit 128. In the illustrated instance of the invention, the two compensating circuits provide a delay of two time periods, to which is added an additional delay of two time periods encountered in extracting data from the computer and from drum B and entering it into the compensating circuits 132 and 144 respectively. Thus a total delay of four time periods is provided, and the difference in timing of the computer's inputs and outputs is set at four time periods. The delay circuit 128 need provide only three time periods of delay, however, as the playback circuit 126 which drives the same inherently provides a one time period delay. In any event, the total amount of the delays in the computer-drum A loop must equal the total amount of the delays in the computer-drum B loop and also the amount of difference in timing between the computer's inputs and outputs, neglecting of course, delays between recording on and reading from the drums.

At this point it is to be mentioned that the reason for intentionally misaligning the drums an amount equal to the duration of an A pulse, or more, is that when the $A_{AO}$ and $A_{BO}$, and $A_{AE}$ and $A_{BE}$ pulses are allowed to coincide in time, the compensating circuits 132 and 144 do not provide the complementary delays required for proper timing but rather, both provide substantially no delay during time period $t_1$ after having been shifted through compensating circuit 132 substantially without delay by coincident $A_{AO}$ and $A_{BO}$ pulses, would be read back at the end of time period $t_1$ of a later cycle and shifted through the compensating circuit 144 substantially without delay by coincident $A_{BE}$ and $A_{AE}$ pulses occurring at the beginning of time $t_2$. Thus the said binary one would be applied to computer input gate 122 during time period $t_2$ rather than during time period $t_4$ as required.

It is believed evident, therefore, that the described means is capable of maintaining synchronism between drum B and computer 110 as long as the misalignment between said drum and drum A which times the operation of the computer does not exceed the capacity of the compensating circuits 132 and 144, which in the illustrated instance of the invention is almost two time periods. It is also believed evident that the capacity of the compensating circuits 132 and 144 may be increased to any desired extent as described in connection with Fig. 3, and also, that the number of drums which may cooperate with a given computer is not limited to two but may be any number as long as one is a master drum connected with the computer in the manner of drum A in Fig. 4 and the others are each connected with the computer in the same manner as drum B of Fig. 4.

Figure 6:
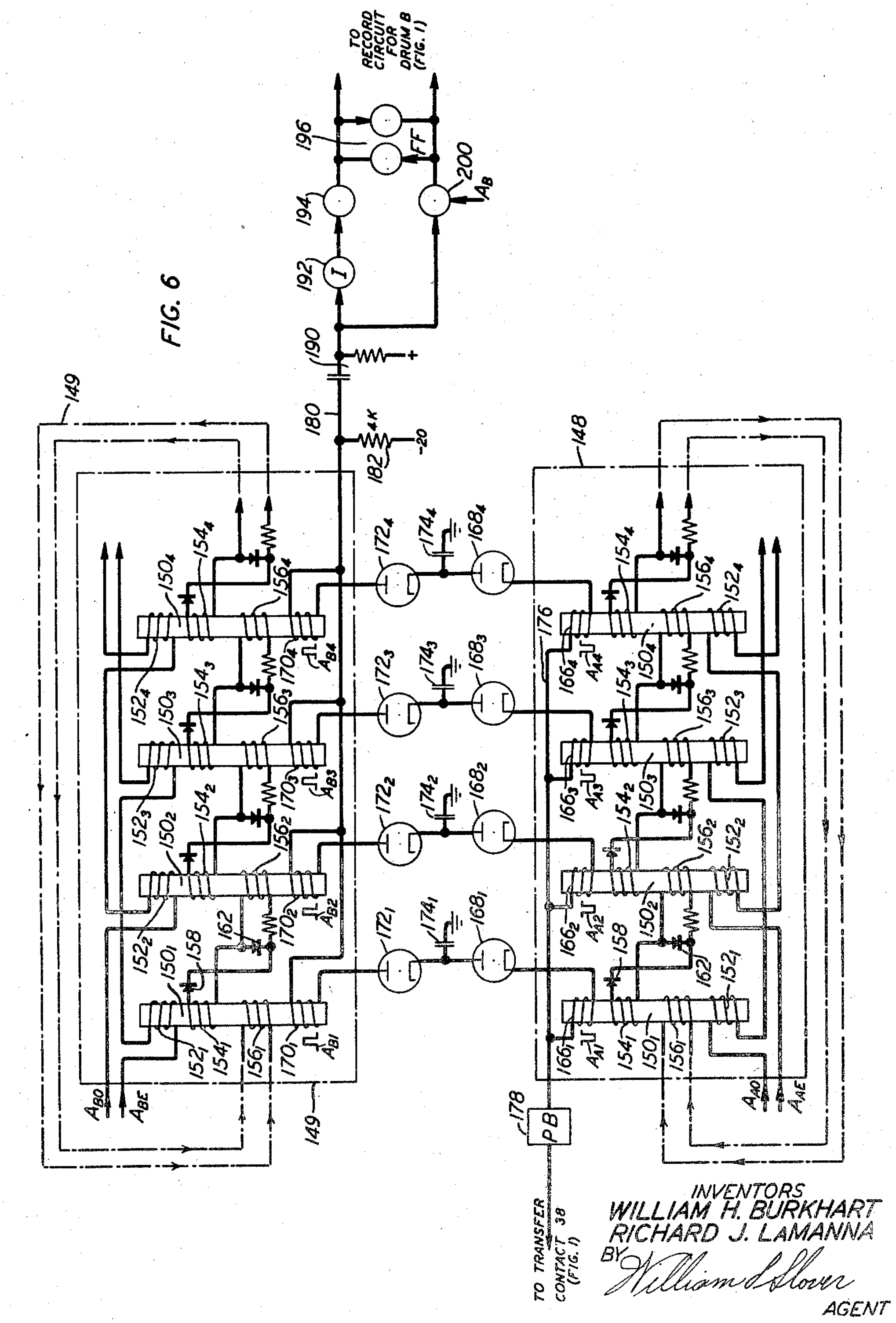
Fig. 6 is a schematic wiring diagram of a modified form of the invention.
Figure 7:
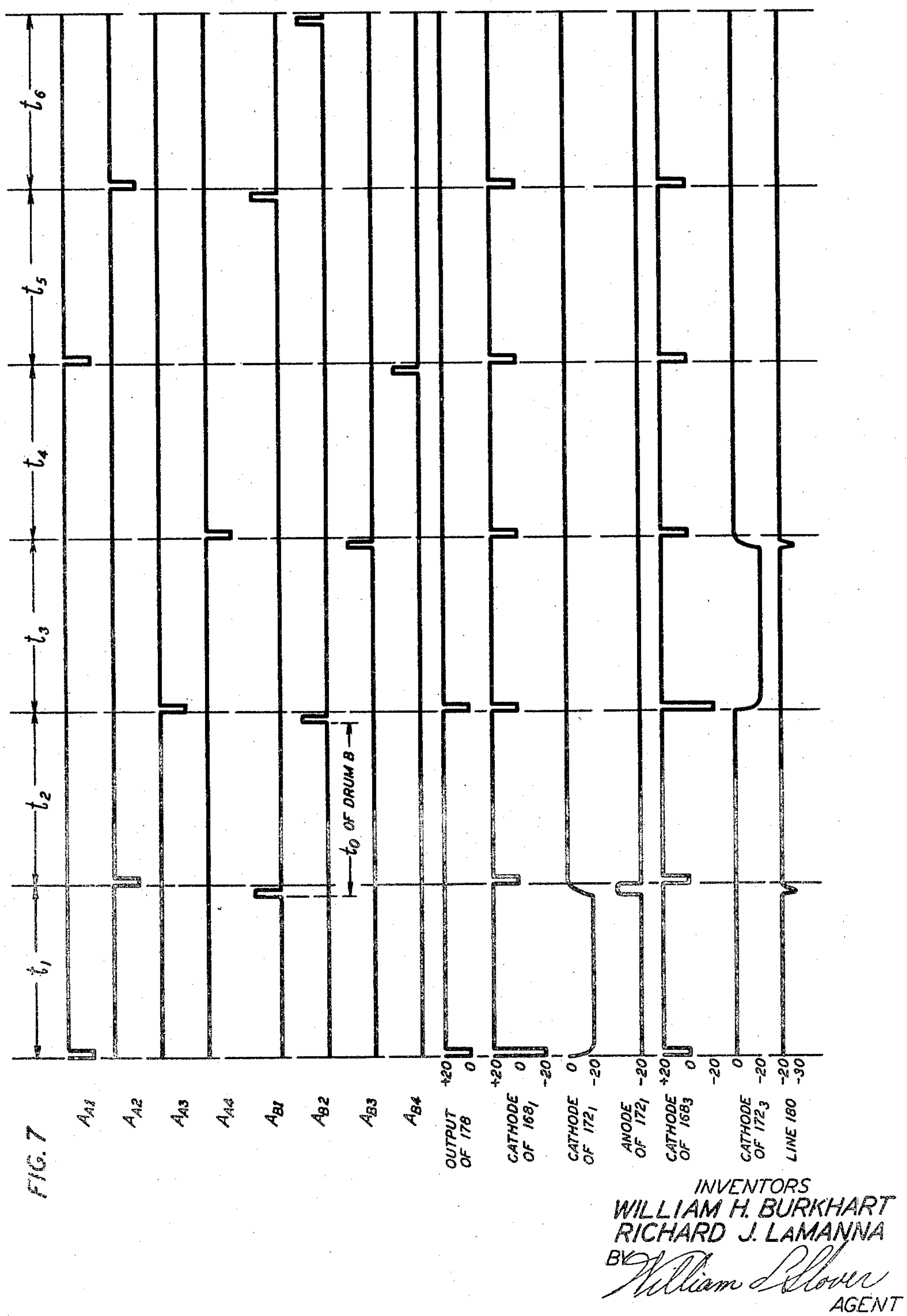
Fig. 7 is a pulse chart which illustrates the mode of operation of the means of Fig. 6.

Referring now to Fig. 6 there is disclosed a modified form of the invention which utilizes a pair of magnetic cores, shift registers 148 and 149 of the sort mentioned above, not only for producing divisional A pulse trains but also for detecting coincidence between the pulses of the divisional trains and data signals or the like from other sources. As illustrated, shift register 148 is controlled by $A_{AO}$ and $A_{AE}$ pulses which may be obtained as described above, the $A_{AO}$ pulses being applied to the odd numbered stages thereof and the $A_{AE}$ pulses being applied to the even numbered stages. Shift register 149 is controlled in like manner by the $A_{BO}$ and $A_{BE}$ pulses except that the former are applied to the even numbered stages thereof and the latter are applied to the odd numbered stages. The purpose of this difference is to accommodate an intentional misalignment of one time period between two drums as will appear hereinafter. Each shift register 148 and 149 may be identical with that described by An Wang in the aforecited article, and for convenience, the elements of the two are given the same reference characters.

Each shift register 148 and 149 includes a series of cores $150_1$, $150_2$, etc., which are constructed of a magnetic material having a substantially rectangular hysteresis loop. In the illustrated instance of the invention each shift register includes four cores. Each core is provided with three windings; namely, an advancing winding 152, an output winding 154 and an input winding 156. Each output winding 154 is connected to the input winding 156 for the next core of the series, and each advancing winding is connected with the source of the appropriate A pulses. Preferably, the output winding 154 for the last core of each shift register is connected to the input winding 156 for the initial core thereof. In order to prevent voltages induced in each input winding 156 from affecting the output winding for the preceding core, the latter is shunted by a diode 162. A series connected diode 158 is also included in the connection between each output winding 154 and the input winding 156 for the next succeeding core, to permit voltages induced in the former to affect the latter, only if they are of appropriate polarity, as will become apparent hereinafter.

For purposes of discussion it will be assumed that a core represents binary one when it is in a state of positive residual magnetism and a binary zero when it is in a state of negative residual magnetism. It will also be assumed that the effect of the $A_{AO}$, $A_{AE}$, $A_{BO}$ and $A_{BE}$ pulses on the cores to whose advancing windings 152 they are applied, is to drive the cores to their binary zero states, that is, into negative saturation.

In the start condition of each shift register, core $150_1$, is in its binary one state while the other cores are in their binary zero states. Application of an A pulse, say an $A_{AO}$ pulse, to the advancing winding of said core $150_1$, causes a large change of flux in said core, from its positive saturation value to its negative saturation value. This large change of flux induces a large positive voltage across output winding $154_1$ of the core to force current through the series diode to drive core $150_2$ into positive saturation. Said $A_{AO}$ pulse is also applied to core $150_3$ but as the same is already in negative saturation, it causes very little, if any, change in flux and very little, if any, voltage is induced in the output winding 154 thereof.

It will be seen, therefore, that successive $A_{AO}$ and $A_{AE}$, or, $A_{BE}$ and $A_{BO}$ pulses, effect shifting of the binary one state of the initial core $150_1$, of the shift register 148 or 149 to the second and third cores, etc., and finally back to the initial core.

According to the invention each core of shift register 148 is provided with an additional winding 166 and each core of shift register 149 is provided with an additional winding 170. Each winding 166 is connected to the cathode of a diode 168, and each winding 170 is connected to the anode of a diode 172. For convenience, the reference characters for the windings 166 and 170, and the diodes 168 and 172 are provided with the same subscripts 1, 2, 3 and 4 as the cores 150 with which they are associated. The anode of each diode $168_1$, $168_2$, etc., and the cathode of the associated diode $172_1$, or $172_2$, etc., are connected together and to a condenser $174_1$, $174_2$, etc., which is connected to ground.

The windings 166 each include sufficient turns in appropriate direction so that when the associated core is driven from positive saturation to negative saturation in response to an A pulse, a negative pulse of, say −20 volts, is induced therein. These pulses will hereinafter be referred to as pulses $A_{A1}$, $A_{A2}$, $A_{A3}$, etc., depending on the core 150 which effects production thereof. The windings 170, however, are wound in the opposite direction so that positively directed pulses of approximately 20 volts are induced therein when the associated cores are driven from positive to negative saturation. These pulses will hereinafter be referred to as pulses $A_{B1}$, $A_{B2}$, etc., depending on which core effects production thereof. The pulses $A_{A1}$, $A_{A2}$, $A_{B1}$, $A_{B2}$, etc., occur repetitively as the binary ones stored in the shift register rings 148 and 149 are shifted around and around the rings.

The several windings 166 are also connected in common, via a line 176, with the output of a reading or playback circuit 178 for drum A. Playback circuit 178 may be of any suitable sort adapted to apply code pulses to line 176 under control of data read back from the drum. In the illustrated instance of the invention, it is desired to normally maintain line 176 at a potential of approximately +20 volts but to lower the potential thereof to approximately zero volts on coincidence between an A pulse and a binary one signal read back from the drum. Therefore, the reading circuit 178 may include suitable amplifiers to amplify the signals read back from the drum, a coincidence detector operable at A pulse time of each time period to determine the identity of the amplified signals as binary one and binary zero and arranged to produce the desired 0 and +20 volt potentials, and a cathode follower controlled by the coincidence detector and adapted to drive the windings 166 via the line 176. Inasmuch as circuits of this sort are well known in the art the same have not been illustrated and will not be described further.

The several windings 170 are connected to a common line 180 which, in turn, is connected with a source of negative potential, say −20 volts, by a resistor 182.

In order to facilitate an understanding of the mode of operation of the means of Fig. 6, it will be assumed that drum B is lagging drum A almost one full time period in addition to an intentional lag of one time period introduced for the purpose set forth hereinabove. Also, it will be assumed that binary ones recorded on drum A during time periods $t_0$ and $t_2$ of a preceding cycle are to be read back and rerecorded on drum B during time periods $t_0$ and $t_2$. Reading circuit 178 applies signals (zero volts) representative of said binary ones to the windings 166 of shift register 148 coincidentally with the application of the $A_{AO}$ pulses which initiate time periods $t_1$ and $t_3$, to the windings 152 on the odd numbered cores of said shift registers. The $A_{AO}$ pulse which initiates time period $t_1$ drives core $150_1$ which is saturated positively to represent binary one, into negative saturation and a negative pulse of substantially −20 volts is induced in the winding $166_1$ thereon. This −20 volt pulse combines with the binary one signal (zero volt) applied to the said winding $166_1$ by reading circuit 178 and a −20 volt pulse is applied to the cathode of diode $168_1$. This negative pulse charges the condenser $174_1$ to a negative value of substantially −20 volts. At the same time, the change in the state of core $150_1$ induces a voltage across the output winding 154 thereof which, in the manner described above, is applied to the input winding 156 of core $150_2$ to drive the latter into positive saturation.

Almost a full time period later the $A_{BE}$ pulse which initiates time period $t_0$ of drum B is applied to the winding $152_1$ of core $150_1$ of shift register 149, and a positively directed pulse $A_{B1}$ is induced in winding $170_1$ on said core. This positively directed pulse effects conduction of diode $172_1$ and the condenser $174_1$ is charged positively to substantially zero volts. The charging current flowing through the conducting diode effects an IR drop across resistor 182 and the potential of line 180 drops from its normal −20 volts level to, say −30 volts to indicate a binary one.

Immediately following the occurrence of the $A_{BE}$ pulse, which initiates time period $t_0$ of drum B, the $A_{AE}$ pulse which initiates time period $t_2$ of drum A, occurs and transfers the binary one state of core $150_2$ of shift register 148 to core $150_3$. This transfer is effected by driving core $150_2$ into negative saturation, which action in turn effects induction of a pulse $A_{A2}$ in the winding 166 for said core. This negative pulse $A_{A2}$ combines with the output of reading circuit 178 which at that time is +20 volts to indicate binary zero, and a substantially zero volt potential is applied to the cathode of diode $168_2$. It is assumed that under this condition the diode does not conduct. Thus condenser $174_2$ is not charged negatively and diode $172_2$ does not conduct when, at the beginning of time period $t_1$ of drum B, a positively directed pulse $A_{B2}$ is induced in the winding 170 of core $150_2$ of shift register 149. This condition prevents current flow in resistor 182 and line 180 is maintained at the −20 volt potential level to indicate binary zero.

At the beginning of time period $t_3$ of drum A, a binary one signal is applied to the winding 166 on core $150_3$ of shift register 148 coincidentally with the induction in said winding of a negative pulse $A_{A3}$. This results in the same sort of operation as described above in connection with time period $t_1$ of drum A, and the potential level of line 180 drops to approximately −30 volts during the span of the $A_{B3}$ pulse which occurs at the beginning of time period $t_2$ of drum B.

It will be seen, therefore, that the described arrangement compensates for misalignments between drums A and B, or other similar devices, and produces on line 180, negatively directed pulses indicative of binary ones. These pulses are synchronized with drum B, and as will presently be described, are applied to means which effect appropriate operations of a record circuit for said drum; for example, the record circuit 32 of Fig. 1. It is to be mentioned that whereas the circuit illustrated in Fig. 6 is capable of compensating for misalignments which may be equal to almost four full time periods, the said circuit may be modified by the addition of further shift register stages and inter-connecting means, therefor to handle any amount of misalignment.

The negative pulses which appear on line 180 to indicate binary ones may be used to control any suitable sort of circuit adapted to effect appropriate operations of the record circuit for drum B. For example, the said line may be applied to a differentiating circuit 190 whose resistor is connected to ground or to a source of positive potential, and the output of the differentiator may be applied to the grid of an inverter 192 which drives a puller 194 for a flip-flop 196. Preferably, inverter 192 is provided with a slight bias to overcome the effects of noise on the line 180 in known manner. Puller 194 sets flip-flop 196 to indicate binary one and the latter is reset to its zero state by any suitable means, for example, by a pentode puller 200 controlled jointly by the output of differentiator 190 and by $A_B$ pulses or the like which permit operation thereof only at those instants when a binary one signal may occur. Thus puller 200 operates whenever a binary one signal fails to appear on line 180 at the appointed time.

The appropriate output of flip-flop 196 is connected to the record circuit for drum B (Fig. 1) which is enabled for operation in accordance with the settings of the flip-flop, at R pulse time of each time period of drum B.

At this point it is worthwhile mentioning that in order to produce satisfactory negative pulses on line 180 the magnitude of resistor 182 must be large with respect to the resistance of the windings 170 and of the diodes 172 so as to ensure sufficiently large IR drops thereacross, but at the same time must be small enough so that the time constant of the same and each condenser 174 is sufficiently small with respect to the duration of an $A_{B1}$, $A_{B2}$, etc. pulse. For example where the pulses $A_{B1}$, $A_{B2}$, etc., have a duration of approximately 5 microseconds, and each condenser 174 is of the order of .001 microfarad, resistor 182 may be of the order of 4,000 ohms.

It will be seen, therefore, that according to the invention, misalignments between a pair of binary data storage devices or carriers may be considered as lags of one of the devices and that misalignments or lags equalling up to *n* bit recording times are compensated for by means including *n* first binary storage elements, means synchronized with the leading storage device for extracting data bits from the same and entering them into said first storage elements in succession, every *n*th bit into each said element, a second binary storage element, means synchronized with the lagging storage device for transferring the data bits stored in the first elements to said element successively in the same order in which the same were entered into the former and means synchronized with the lagging storage device to which the bits stored in said second element are transferred. In the first described form of the invention the first and second binary storage elements comprised flip-flops while in the last described form thereof, the first storage elements comprise condensers and the second storage element comprises a flip-flop. Further, the said second binary storage element may be eliminated and the desired controls effected by the transferring means in single pulse systems.

Whereas the above description is limited to binary signals and binary digit storage elements it is to be understood that other types of signals and storage elements appropriate thereto may be substituted therefor without departing from the spirit and principle of the invention. For example quinary signals may be used and quinary digit storage elements capable of being set to five distinct states may be substituted for the described flip-flop and condenser binary digit storage devices.

While there have been above described but a limited number of embodiments of the invention it will be understood that many changes and modifications may be made therein without departing from the spirit of the invention, and it is not desired, therefore, to limit the scope of the invention except as pointed out in the appended claims or as dictated by the prior art.

We claim:

1. Apparatus for transferring electrical data pulse trains between synchronously operating binary data handling devices which may be out of phase whereby the receiving device lags the other up to any number *n* of binary digit handling times comprising *n* binary storage elements, means controlled by the leading data handling device for extracting data from said leading device and setting the binary storage elements in accordance with the values of successive binary digits of the extracted data, each said storage element being set in accordance with the value of every *n*th binary digit and means controlled by the lagging data handling device for successively sensing each of said storage elements to determine the value of the said every nth digit it is set to represent for entry in said lagging device.

2. The combination according to claim 1 and including a second binary storage element settable successively by the sensing means in accordance with the sensed settings of the first storage elements.

3. The combination according to claim 2 wherein the first mentioned storage elements comprise condensers and the second binary storage element comprises a flip-flop.

4. In electronic digital data handling means, the combination of a pair of devices capable of accepting and transmitting timed binary data signal trains, said devices operating synchronously but being out of phase with one another to the extent that one lags behind the other less than some number $n$ binary digit signal times, $n$ binary digit storage flip-flops, pullers for setting said flip-flops, the data signal trains transmitted from the leading device being applied to the pullers for all of the flip-flops, means controlled by said leading device for producing $n$ interlaced control pulse trains and applying them to said pullers selectively to permit control of the puller for each flip-flop only by every *n*th data signal applied thereto whereby each flip-flop is set in accordance with every *n*th digit, and means controlled with the lagging device for sensing each said flip-flop to determine the value of the said every *n*th digit it is set to represent for entry in said lagging device.

5. The combination according to claim 4 and including a binary digit storage unit controlled by said sensing means.

6. The combination according to claim 5 wherein the sensing means comprise $n$ pullers each controlled by a said flip-flop, and the storage unit controlled by the sensing means comprises another flip-flop settable to represent binary one by any of said $n$ pullers, and including means synchronized with the lagging device for producing $n$ interlaced trains of control pulses and applying them to the last said pullers selectively to permit operation of each once for each setting of the flip-flop controlling the same, and means for setting said other flip-flop to represent binary zero whenever a first mentioned flip-flop is in a binary zero state on application to the puller controlled thereby of a pulse of the associated control pulse train.

7. The combination according to claim 6 and including means controlled by said other flip-flop for applying binary data signals to the lagging device.

8. Means for compensating for phase deviations between a plurality of synchronously operating binary data storage devices each capable of accepting and emitting timed, data representative, binary signal trains and a cyclically operable computer arranged to accept data signal trains from the storage devices only during predetermined signal times of each cycle and to transmit data signal trains to the storage devices only during those signal times of each cycle which are some number $m$ of signal times earlier than said predetermined times, the computer being in phase with one of said storage devices, and the said deviations appearing as lags of the others behind said one storage device, comprising means for delaying data signals transmitted from said one storage device to the computer, $m$ signal times, means for delaying data signals transmitted from the computer to each other storage device variable amounts to compensate for phase deviations between the two, and means for delaying data signals transmitted from each said other storage device to the computer variable amounts to compensate for phase deviations between the two, the total delay afforded by the compensating means plus any other delays encountered in transmitting data signals between the computer and said other devices equalling $m$ signal times.

9. The combination according to claim 8 wherein each compensating means comprises a plurality of binary digit storage units settable successively under the control of the device from which data signals are transmitted thereto and in accordance with the values of said digits, there being one said unit for each data signal time or partial signal time of delay the compensating means is to provide, and means under the control of the device to which said signals are applied by the compensating means, for sensing the settings of said units successively, in the same order in which they are set.

10. The combination according to claim 8 wherein each compensating means comprises a plurality of binary digit storage units settable successively under the control of the device from which data signals are transmitted thereto and in accordance with the values of said digits, there being one said unit for each data signal time or partial signal time of delay the compensating means is to provide, a further binary digit storage unit and means under the control of the device to which said signals are applied by the compensating means, for transferring the settings of the first said units to said further unit in the same order in which they are set.

11. The combination according to claim 3 wherein said means controlled by said leading and lagging data handling devices comprise a pair of magnetic core shift registers each including at least $n$ stages with the output of the last stage coupled back to the input of the first stage, and each having the first stage initially set to one state and the other stages to the opposite state, means under the control of each of said data handling devices for shifting the said initial setting of the first stage, to the other stages in succession, one stage per data signal time, respectively, a winding in each stage of the shift register associated with the leading data handling device to which the data signals emitted from the latter are applied and in which a control pulse is induced on a change in the state of the stage from a predetermined one of its states to the other, each of said condensers respectively connected with a said winding and charged with a predetermined polarity on application to said winding of a binary data signal of predetermined value, a winding in each stage of the shift register under the control of the lagging data handling device, connected with the condenser for the associated stage of the other shift register and in which a control pulse is induced on a change in the state of the stage from a predetermined one of its states to the other, a said control pulse charging the said condenser with the opposite polarity to said predetermined polarity if the same had previously been charged with the latter polarity, and a common output line maintained at a given potential but to which the last said windings are connected to change the potential thereof on charging of said condenser with said opposite polarity.

12. The combination according to claim 11 and including a plurality of diodes, one in the connection between each first said winding and the associated condenser and one in the connection between each of the latter and the associated last said winding, said diodes preventing charging of said condensers under conditions other than those recited.

13. The combination according to claim 12 and including means controlled by the means for shifting the settings of the stages of the shift register associated with the output line and also by the latter for setting said flip-flop to one state to represent a predetermined binary digit and means for setting said flip-flop to the opposite state.

14. Means for compensating for phase deviations between a pair of synchronously operating data handling devices of which one lags the other variable amounts up to any number $n$ of digit handling times comprising $n$ digit storage elements, means under the control of the leading data handle for extracting data from the same and setting the storage elements in accordance with the values of successive digits of the extracted data, each said storage element being set in accordance with the value of every $n$th digit and means under the control of the lagging data handler for sensing each said storage element to determine the value of the said every $n$th digit it is set to represent.

15. In electronic digital data handling means, the combination of a pair of synchronously operating devices capable of accepting and transmitting timed digital data signal trains, said devices being out of phase with one another to the extent that one lags behind the other less than some number $n$ of digit signal times, $n$ digit storage units, means for setting said storage units in succession according to the values of the digits represented by the data signals transmitted from the leading device, each unit being set in accordance with every $n$th digit, and means under the control of the lagging device for sensing each said storage unit to determine the value of the said every $n$th digit it is set to represent.

16. Means for compensating for phase deviations between a plurality of synchronously operating binary data storage devices each capable of accepting and emitting timed, data representative, binary signal trains and a cyclically operable data processor arranged to accept data signal trains from the storage devices only during predetermined signal times of each cycle and to transmit data signal trains to the storage devices only during those signal times of each cycle which are some number $m$ of signal times earlier than said predetermined times, the data processor being synchronized and in phase with one of said storage devices, and the said deviations appearing as lags of the others behind said one storage device, comprising means for delaying data signals transmitted from said one storage device to the data processor, $m$ signal times, means for delaying data signals transmitted from the data processor to each other storage device variable amounts to compensate for phase deviations between the two, and means for delaying data signals transmitted from each said other storage device to the data processor variable amounts to compensate for phase deviations between the two, the total delay afforded by the compensating means plus any other delays encountered in transmitting data signals between the data processor and said other devices equalling $m$ signal times.

17. Means for compensating for phase deviations between a plurality of synchronously operating digital data storage devices each capable of accepting and emitting timed, data representative, digital signal trains and a cyclically operable data processor arranged to accept data signal trains from the storage devices only during predetermined signal times of each cycle and to transmit data signal trains to the storage devices only during those signal times of each cycle which are some number $m$ of signal times earlier than said predetermined times, the data processor being synchronized and in phase with one of said storage devices and the said deviations appearing as lags of the others behind said one storage device, comprising means for delaying data signals transmitted from said one storage device to the data processor, $m$ digit signal times, means for delaying data signals transmitted from the data processor to each other storage device variable amounts to compensate for phase deviations between the two, and means for delaying data signals transmitted from each said other storage device to the data processor variable amounts to compensate for phase deviations between the two, the total delay afforded by the compensating means plus any other delays encountered in transmitting data signals between the data processor and said other device equalling $m$ digit signal times.

18. The combination according to claim 17 wherein each compensating means comprises a plurality of digit storage units settable successively under the control of the device from which digit signals are transmitted thereto and in accordance with the values of said digits, there being one said unit for each digit signal time or partial signal time of delay the compensating means is to provide, and means under the control of the device to which said signals are applied by the compensating means, for sensing the settings of said units successively, in the same order in which they are set.

19. Means for compensating for phase deviations between a plurality of synchronously operating digital, data storage devices each capable of accepting and emitting timed, data representative, digital signal trains and a cyclically operable data processor arranged to transmit data signals to the storage devices only during predetermined signal times of each cycle, the data processor being in phase with one of said storage devices and the said deviations appearing as leads of the storage device with which the data processor is in phase, means for delaying data signals transmitted from the data processor to each lagging storage device variable amounts to compensate for phase deviations between the two, and means for delaying data signals transmitted from each lagging storage device to the data processor, variable amounts to compensate for phase deviations between the two, means for delaying data signals transmitted from the leading device to the data processor a fixed amount equal to the sum of the delays imparted to signals transmitted from the data processor to each lagging storage device and the delay imparted to signals transmitted from a lagging storage device to the data processor, and means to permit application of data signals from the storage devices to the data processor only during those signal times of each cycle which are later than said predetermined times by an amount equal to the said fixed amount.

References Cited in the file of this patent

UNITED STATES PATENTS 2,637,812 Hagen ---------------- May 5, 1953

OTHER REFERENCES

Progress Report (2) on the EDVAC, Moore School of Electrical Engineering, Univ. of Pa., June 30, 1946, declassified February 13, 1947, pp. 4–26 to 4–27 incl. only.

Buffering Between Input-Output and the Computer, A. L. Leiner, Review of Input and Output Equipment Used in Computing Systems; Joint AIEE–IRE–ACM Computer Conference, New York, N. Y., December 10–12, 1952; published March 1953 by A. I. E. E., pages 22–30 only.

UNITED STATES PATENT OFFICE

CERTIFICATE OF CORRECTION atent No. 2,860,323 — November 11, 1958

William H. Burkhart et al.

It is hereby certified that error appears in the printed specification of the above numbered patent requiring correction and that the said Letters Patent should read as corrected below.

Column 3, line 73, for "signal" read -- single --; column 7, line 41, after "of", first occurrence, strike out "a"; column 9, line 68, after "the drums" insert a comma; column 12, line 45, for "encountered tn" read -- encountered in --; column 17, line 32, for "controlled with" read -- controlled by --; column 19, line 8, for "handle" read -- handler --; column 20, line 49, for "fiixed" read -- fixed --.

Signed and sealed this 10th day of March 1959.

(SEAL)
Attest:

KARL H. AXLINE
Attesting Officer

ROBERT C. WATSON
Commissioner of Patents